United States Patent
Kosaka et al.

(10) Patent No.: US 11,001,121 B2
(45) Date of Patent: May 11, 2021

(54) VEHICULAR SUSPENSION DEVICE

(71) Applicant: NTN CORPORATION, Osaka (JP)

(72) Inventors: Shuichi Kosaka, Iwata (JP); Yuta Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/511,290

(22) Filed: Jul. 15, 2019

(65) Prior Publication Data

US 2019/0337351 A1    Nov. 7, 2019

Related U.S. Application Data

(63) Continuation of application No. PCT/JP2018/000527, filed on Jan. 11, 2018.

(30) Foreign Application Priority Data

Jan. 18, 2017    (JP) .............................. JP2017-006390

(51) Int. Cl.
*B60G 21/10*    (2006.01)
*B60G 3/18*    (2006.01)

(52) U.S. Cl.
CPC ............. *B60G 21/106* (2013.01); *B60G 3/18* (2013.01); *B60G 2200/14* (2013.01); *B60G 2204/424* (2013.01); *B60G 2204/62* (2013.01); *B60G 2400/0511* (2013.01); *B60G 2400/204* (2013.01); *B60G 2400/252* (2013.01);
(Continued)

(58) Field of Classification Search
CPC .......... B60G 2204/424; B60G 2204/62; B60G 2400/0511; B60G 21/106; B60G 17/016; B60R 21/0132
See application file for complete search history.

(56) References Cited

U.S. PATENT DOCUMENTS

| 4,573,702 A | 3/1986 | Klem |
| 6,007,072 A | 12/1999 | Yoon |
| (Continued) | | |

FOREIGN PATENT DOCUMENTS

| JP | 63-95908 | 6/1988 |
| JP | 64-36201 | 3/1989 |
| (Continued) | | |

OTHER PUBLICATIONS

Nozaki et al. JP 2621525 B2, Machine English Translation, ip.com (Year: 1997).*

(Continued)

*Primary Examiner* — Karen Beck

(57) ABSTRACT

Provided is a vehicular suspension device that achieves both of improvement in driving stability and improvement in vehicle movement performance. The vehicular suspension device includes a suspension capable of adjusting a roll center height by control of an actuator, and a roll center controller. The controller includes a traveling state corresponding height determination unit configured to determine the roll center height of the suspension in accordance with a predetermined rule on the basis of vehicle speed information and road surface information, and an actuator controller configured to control the actuator so that the roll center height reaches the roll center height determined by the unit.

6 Claims, 7 Drawing Sheets

(52) U.S. Cl.
CPC .... *B60G 2400/821* (2013.01); *B60G 2600/21* (2013.01); *B60G 2800/012* (2013.01)

(56) References Cited

U.S. PATENT DOCUMENTS

| | | | | |
|---|---|---|---|---|
| 2005/0280219 | A1* | 12/2005 | Brown | B60G 3/20 |
| | | | | 280/5.5 |
| 2011/0015844 | A1* | 1/2011 | Perkins | B60T 8/17554 |
| | | | | 701/69 |
| 2011/0208391 | A1* | 8/2011 | Mizuta | B60G 17/0165 |
| | | | | 701/37 |
| 2014/0297116 | A1* | 10/2014 | Anderson | H02K 7/1823 |
| | | | | 701/37 |
| 2015/0158360 | A1* | 6/2015 | Uebayashi | B62K 5/10 |
| | | | | 280/5.508 |
| 2015/0239523 | A1* | 8/2015 | Ginther | B62K 25/04 |
| | | | | 701/37 |
| 2015/0343874 | A1 | 12/2015 | Kurata et al. | |
| 2016/0375948 | A1* | 12/2016 | Takenaka | B60K 11/00 |
| | | | | 280/5.506 |
| 2018/0281547 | A1* | 10/2018 | Koumura | B60G 17/0162 |
| 2019/0176560 | A1* | 6/2019 | Bittner | B60G 17/0165 |
| 2019/0308611 | A1* | 10/2019 | Lee | B60G 21/0558 |
| 2020/0114721 | A1* | 4/2020 | Tanzan | B60G 17/0195 |

FOREIGN PATENT DOCUMENTS

| | | | | |
|---|---|---|---|---|
| JP | | 5-213027 | 8/1993 | |
| JP | | 5-270232 | 10/1993 | |
| JP | | 2621525 B2 * | 6/1997 | ............. B60G 7/006 |
| JP | | 2007-22287 | 2/2007 | |
| JP | | 2018114819 A * | 7/2018 | ......... B60G 17/0165 |
| KR | | 100293680 B1 * | 4/2001 | |
| WO | WO-2005102762 A1 * | | 11/2005 | ......... B60L 15/2036 |
| WO | WO-2018230425 A1 * | | 12/2018 | ........... B60G 17/015 |

OTHER PUBLICATIONS

M. Sugiyama, WO 2005/102762 A1 Machine English Translation, ip.com (Year: 2005).*

Takaaki Uno, "Vehicle movement performance and chassis mechanism", 14$^{th}$ impression, May 29, 2014, Grand Prix Book Publishing, pp. 82-83, 106-113.

International Search Report dated Mar. 27, 2018 in corresponding International Patent Application No. PCT/JP2018/000527.

English Translation by WIPO of the International Preliminary Report on Patentability dated Aug. 1, 2019 in corresponding International Patent Application No. PCT/JP2018/000527.

Extended European Search Report, dated Sep. 1, 2020, in corresponding European Application No. 18741188.9 (10 pp.).

* cited by examiner

VEHICULAR SUSPENSION DEVICE

CROSS REFERENCE TO THE RELATED APPLICATION

This application is a continuation application, under 35 U.S.C. § 111(a), of international application No. PCT/JP2018/000527, filed Jan. 11, 2018, which claims priority to Japanese patent application No. 2017-006390, filed Jan. 18, 2017, the disclosure of which are incorporated by reference in their entirety into this application.

BACKGROUND OF THE INVENTION

Field of the Invention

The present invention relates to a vehicular suspension device capable of adjusting the height of a roll center position during traveling.

Description of Related Art

In conventional technology, with use of a vehicular suspension device capable of adjusting the heights of the roll center positions (hereinafter, may be referred to as "roll center heights") of the front and rear wheels while keeping the vehicle height, the roll center heights of the front and rear wheels in a suspension mechanism are adjusted in accordance with changes in the mass on spring and the gravity center point on spring at the time when a vehicle is stopped, to obtain a desired roll behavior during turning traveling under different loading conditions (Patent Document 1).

RELATED DOCUMENT

Patent Document

[Patent Document 1] JP Laid-open Patent Publication No. 2007-022287

Non-Patent Document

[Non-Patent Document 1] Uno Takaaki, "Vehicle movement performance and chassis mechanism", 14th impression, May 29, 2014, Grand Prix BOOK PUBLISHING

SUMMARY OF THE INVENTION

In Patent Document 1, with use of the vehicular suspension capable of adjusting the roll center heights of the front and rear wheels while keeping the vehicle height, the roll center heights of the front and rear wheels in the suspension mechanism are adjusted in accordance with changes in the mass on spring and the gravity center point on spring when the vehicle is stopped, to obtain a desired roll behavior in turning traveling under different loading conditions. Here, as shown in FIG. 12, a vertical force $F_z$ is generated on the wheel when an external force (lateral force) $F_y$ is applied to the wheel. The vertical force is determined by the lateral force $F_y$ and an angle θ formed by the ground surface and the direction to the position of a roll center $C_f$, and is represented by Equation (1).

$$F_z = F_y \tan \theta \quad (1)$$

Such a lateral force is generated on a rough road or the like. In Patent Document 1, the roll center height is determined in consideration of only the roll behavior in turning traveling, and a vertical force when an external force is applied to a wheel is not taken into consideration. Therefore, vehicle driving stability is reduced.

For example, when the gravity center point on spring becomes high, the roll center position is raised to change the roll behavior. At this time, the vertical force generated due to an external force applied to a wheel increases, so that the vehicle becomes likely to wobble, leading to reduction in vehicle driving stability.

The present invention has been made to solve the above problem and an object of the present invention is to provide a vehicular suspension device that achieves both of improvement in driving stability and improvement in vehicle movement performance. Hereinafter, the summary of the present invention will be described using reference characters in the drawings showing embodiments.

A vehicular suspension device according to the present invention includes: a suspension 1 that supports a front wheel or a rear wheel so as to allow a roll center height of a vehicle to be adjusted by an actuator 7; and a roll center controller 16 configured to adjust the roll center height of the suspension 1 by controlling of the actuator 7. The roll center controller 16 includes: a traveling state corresponding height determination unit 15 configured to determine the roll center height of the suspension 1 in accordance with a predetermined rule on the basis of vehicle speed information which is a vehicle speed or information about an estimated vehicle speed, and road surface information which is information about a road surface on which the vehicle is traveling; and an actuator controller 13 configured to control the actuator 7 of the suspension 1 so that the roll center height reaches the roll center height determined by the traveling state corresponding height determination unit 15.

The "information about an estimated vehicle speed" may be information about the speed limit of the road on which the vehicle is traveling, for example. In this case, under the assumption that the vehicle is traveling at the speed limit, the speed limit is used as substitute for the vehicle speed. The "road surface information" is, for example, information for discriminating a paved road, a general non-paved road, a road surface with great irregularity, and the like, and is obtained from detected values such as the stroke change amount of the suspension 1 and the vertical acceleration of the vehicle body. The "predetermined rule" is set as appropriate in accordance with designing.

In the above configuration, the roll center height of the suspension 1 is controlled in accordance with the traveling state figured out from the speed and the road surface state. Accordingly, the relationship between the roll center height, and speed information and road surface information, is set as appropriate to be a proper relationship, and the roll center height is changed by matching the speed information and the road surface information with the relationship, whereby stability in driving the vehicle is improved.

For example, in the case of traveling on a road surface having great irregularity as in a rough road, an external force applied to each wheel increases. Therefore, if the external force applied to each wheel 8 is estimated to be great from the vehicle speed information and the road surface information as in the case of traveling on a rough road, the roll center positions of the front and rear wheels are lowered (brought close to ground surface), to reduce the vertical force applied due to the external force applied to each wheel 8. By reducing the vertical force applied to each wheel 8, wobbling of the vehicle is suppressed and stability in driving the vehicle is improved.

On the other hand, in the case where the vehicle speed is high, a great lateral acceleration is applied to the vehicle during turning, so that the inertial force in the lateral direction of the vehicle increases. Therefore, if, on the basis of the vehicle speed information and the road surface information, the inertial force in the lateral direction of the vehicle is estimated to be great during turning as in the case of traveling at a high vehicle speed, the roll center positions of the front and rear wheels 8 are raised (moved away from ground surface), to reduce the roll moment applied to the vehicle during turning. By reducing the roll moment generated during turning, the roll amount of the vehicle is decreased and contact of the turning inner wheels with the ground is ensured, whereby vehicle movement performance is improved. In this way, by adjusting the roll center heights in accordance with the traveling state of the vehicle, it is possible to achieve both of improvement in driving stability and improvement in vehicle movement performance.

In the present invention, the traveling state corresponding height determination unit 15 may include: a traveling state evaluation value calculation unit 11 configured to calculate a traveling state evaluation value in accordance with a predetermined evaluation rule on the basis of the vehicle speed information and the road surface information; and a roll center position determination unit 12 configured to determine the roll center height of the suspension 1 in accordance with the traveling state evaluation value calculated by the traveling state evaluation value calculation unit 11. Calculating the traveling state evaluation value in accordance with the predetermined evaluation rule on the basis of the vehicle speed information and the road surface information and controlling the roll center height of the suspension 1 in accordance with the evaluation value as described above, makes it possible to perform the roll center height control more appropriately and more easily. The "predetermined evaluation rule" is set as appropriate in accordance with designing.

In the present invention, the traveling state corresponding height determination unit 15 may determine the roll center height such that, during turning traveling, the roll center position is raised as a speed of the vehicle increases, and the roll center position is lowered when a lateral force applied to the wheel is greater than a predetermined value. Raising the roll center position as the vehicle speed increases during turning traveling as described above improves vehicle movement performance.

In the present invention, the traveling state corresponding height determination unit 15 may use information acquired from outside of the vehicle, as both or one of the vehicle information and the road surface information. Examples of the information acquired from outside of the vehicle include: the speed limit of the road on which the vehicle is traveling, which is obtained from car navigation or an electronic toll collection (ETC) system; road traffic information; road information at the entrance/exit of an expressway, or the like; and position information from a global positioning system (GPS) or the like. Using such information makes it possible to obtain the vehicle information and the road surface information without the vehicle having any measurement instrument therefor. The "vehicle speed information" refers to information including the vehicle speed and the road information, but may be information about only the vehicle speed.

In the present invention, the suspension 1 may have a mechanism that enables adjustment of a vehicle height during traveling. Adjusting the vehicle height and the roll center positions of the vehicle at the same time makes it possible to more effectively achieve both of movement performance and driving stability of the vehicle. As the mechanism for enabling adjustment of the vehicle height during traveling, a shock absorber unit having a vehicle height adjustment function, or the like may be used.

In the present invention, an electric motor 7a may be used as a drive source for the actuator 7. Although a hydraulic device or an electric motor may be employed for the actuator 7, employing an electric motor makes it possible to perform control with high responsiveness and finely.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

First Embodiment

Figure 1:
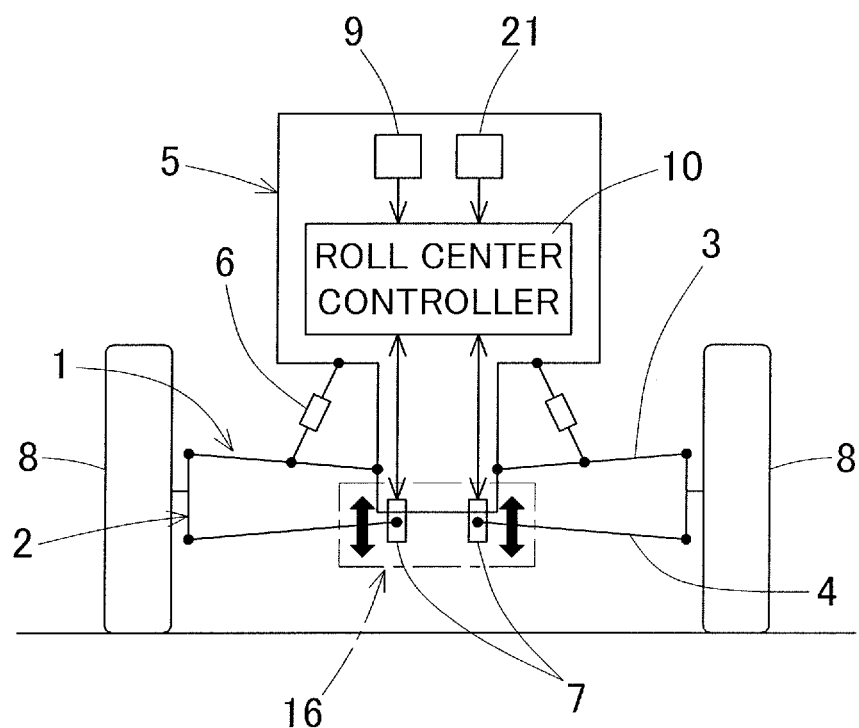
FIG. 1 is a schematic diagram of a vehicular suspension device according to the first embodiment of the present invention.

The first embodiment of the present invention will be described with reference to FIG. 1 to FIG. 9. The vehicular suspension device includes a suspension 1, and a roll center controller 10 for controlling the suspension 1.

The suspension 1 is configured to be capable of supporting each wheel 8 so as to allow a roll center height to be adjusted by an actuator 7. In this example, a double wishbone type suspension is employed as the suspension 1. A knuckle 2 which rotatably supports the wheel 8 is connected to a vehicle body 5 via a pair of an upper arm 3 and a lower arm 4 on the upper and lower sides, of the suspension 1. The upper arm 3 and the lower arm 4 are supported at the base ends rotatably about a support shaft so as to be rockable on the vehicle body 5 side, and the wheel 8 performs a stroke in an up/down direction in accordance with the rocking movement of the upper arm 3 and the lower arm 4. In the case of providing one arm instead of a pair of the upper arm 3 and the lower arm 4 on the upper and lower sides, a shock absorber unit 6 is connected between the vehicle body 5 and the knuckle 2. By a shock absorber unit 6 provided between the upper arm 3 and the vehicle body 5, the vehicle body 5 is supported so as to be elastically movable in an up/down direction and a stroke thereof in the up/down direction is attenuated. A support point on the vehicle body 5 side of the lower arm 4 is connected to the vehicle body 5 via the actuator 7 which is extendable and contractible in an up/down direction of the vehicle body. Thus, the support point on the vehicle body side of the lower arm 4 moves in an up/down direction of the vehicle body in accordance with extension/contraction of the actuator 7.

Figure 10:
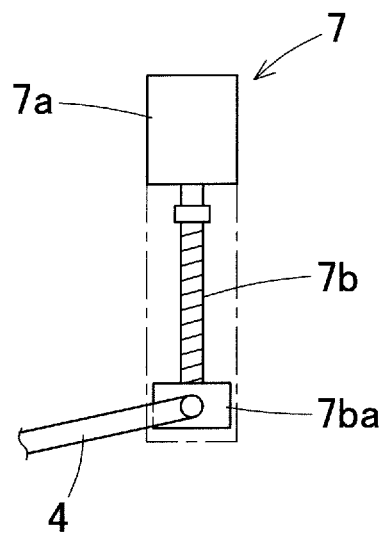
FIG. 10 illustrates an example of an actuator of the vehicular suspension device.

The actuator 7 is a device having a movable end to which the lower arm 4 is connected and which is movable in an up/down direction. The actuator 7 includes a drive source in the form of an electric motor or a hydraulic device such as a hydraulic cylinder. The actuator 7 is controlled by the roll center controller 10. As shown in FIG. 10, the actuator 7 includes, in the case of using an electric motor as the drive source, for example, an electric motor 7a and a linear motion mechanism 7b which converts forward/backward rotation of a ball screw mechanism or the like to linear back-and-forth movement, and the lower arm 4 is connected to a movable end 7ba of the linear motion mechanism 7b. In the case where the actuator 7 is a hydraulic device such as a hydraulic cylinder, the roll center controller 10 controls a valve (not shown) such as a servo valve provided on a hydraulic path.

The roll center controller 10 performs a position control of the actuator 7 on the basis of information from various sensors. The roll center controller 10 is provided as a dedicated electronic control unit (ECU) formed from a computer, or a part of a main ECU (not shown) for performing an integrated control of the entire vehicle, for example. It is noted that right and left actuators 7, 7 form a roll center adjustment unit 16.

Figure 3:
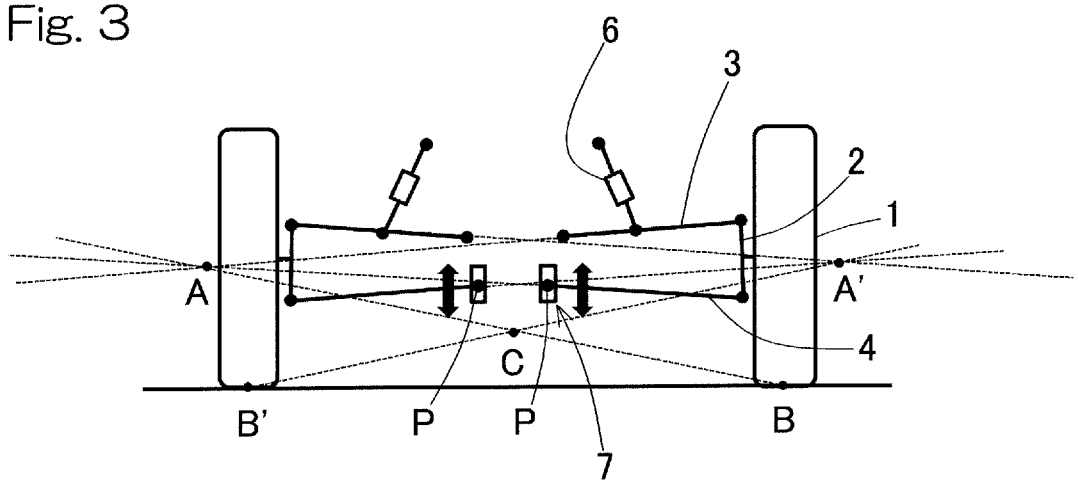
FIG. 3 illustrates a roll center position of the vehicular suspension device.

The roll center positions of the front and rear wheels of the vehicle will be described with reference to FIG. 3. The intersection of lines extended from the upper arm 3 and the lower arm 4 on the right side is defined as an instantaneous rotation center A of a wheel ground-contact point, and the intersection of a line connecting the instantaneous rotation center A and a right wheel ground-contact point B and a line connecting an instantaneous rotation center A' and a wheel ground-contact point B' on the respective opposite sides in the right-left direction, is defined as a roll center C. That is, in each suspension 1 of the four wheels, the position of the support point of the lower arm 4 is adjusted in an up/down direction by the actuator 7 being extended or contracted, whereby a front wheel roll center position Cf (see FIG. 5) and a rear wheel roll center position Cr can be changed.

Figure 4:
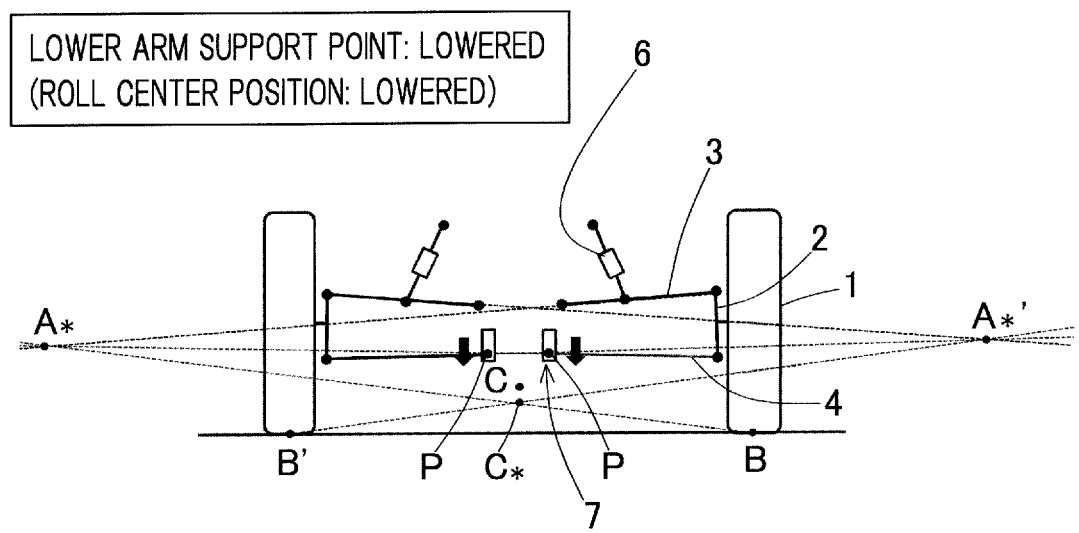
FIG. 4 is a schematic diagram showing a roll center position lowered state of the vehicular suspension device.
Figure 5:
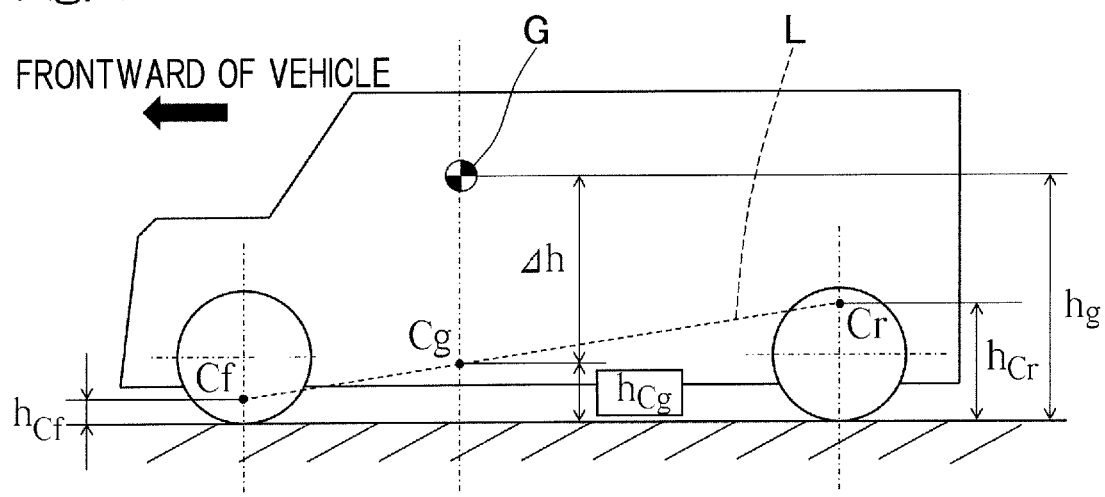
FIG. 5 illustrates the roll center position and the like when a vehicle provided with the vehicular suspension device is viewed from the lateral side.

As an example, FIG. 4 shows a configuration in which the position of a support point P of the lower arm 4 is lowered by the actuator 7. As shown in FIG. 4, when the position of the support point P of the lower arm 4 is lowered, a roll center C* becomes lower than a reference position. Further, as shown in FIG. 5, a line connecting the front wheel roll center Cf and the rear wheel roll center Cr is defined as a roll axis L. Where the gravity center height is denoted by hg, a point on the roll axis L located directly under the gravity center G is denoted by Cg (hereinafter, referred to as "roll center Cg"), and the height from the ground surface to the roll center Cg is denoted by $hc_g$, a length $\Delta h$ of an arm of moment when a force is applied at the gravity center G is represented by the following Equation (2).

$$\Delta h = hg - hc_g \quad (2)$$

Figure 6:
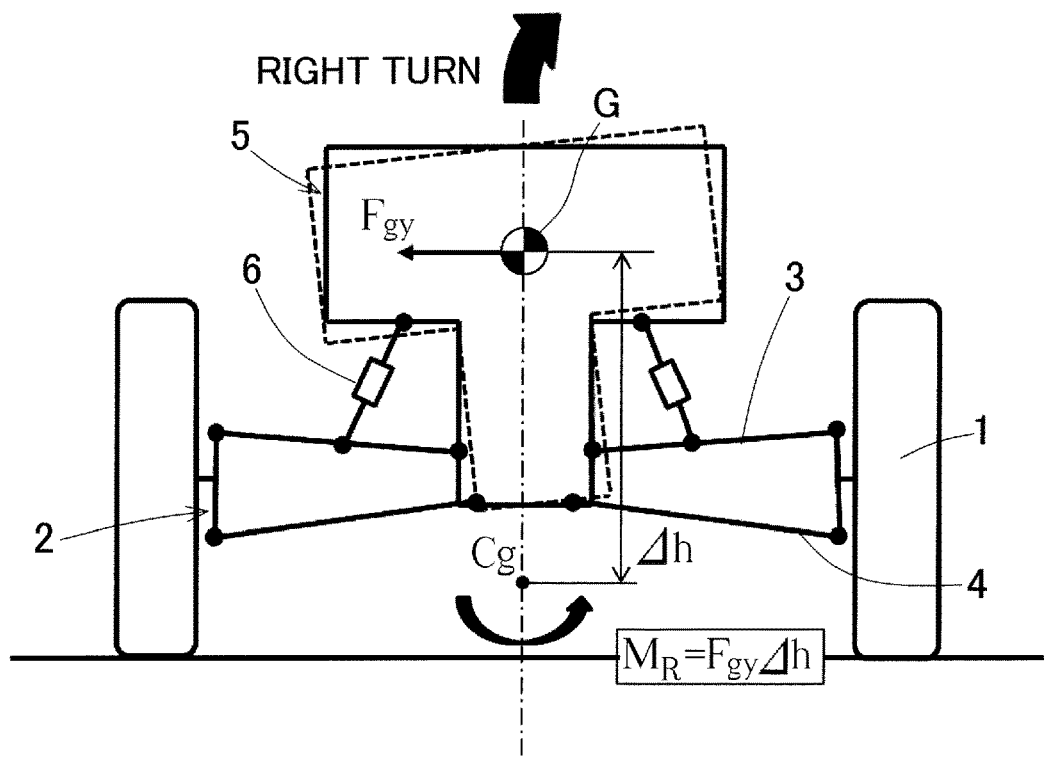
FIG. 6 illustrates movement in turning traveling of the vehicular suspension device.

As shown in FIG. 6, when a centrifugal force $F_{gy}$ acts on the gravity center G during a turning traveling, a roll moment $M_R$ is generated around the roll center Cg. Due to the roll moment $M_R$, the entire vehicle rolls about the roll axis L (see FIG. 5). The roll moment $M_R$ is represented by Equation (3).

$$M_R = F_{gy} \cdot \Delta h \quad (3)$$

Accordingly, as the roll center position becomes higher (farther from ground surface), $\Delta h_h$ is reduced, so that the roll moment $M_R$ is reduced. Therefore, in the case where an inertial force (lateral acceleration) on the vehicle during turning is great when, for example, the speed of the vehicle is high, it is desirable that the roll center position is raised to decrease the vehicle roll amount. By decreasing the roll amount in turning, contact of the turning inner wheel with the ground is ensured, whereby movement performance of the vehicle can be improved.

On the other hand, when an external force (lateral force) is applied to the wheel, a vertical force is generated (see Non-Patent Document 1). Such a lateral force is generated on a rough road or the like. A vertical force $\Delta Fz$ is determined by a lateral force $F_y$ and an angle θ formed by the ground surface and the direction to the roll center position $C_f$, and is represented by Equation (4).

$$\Delta Fz = Fy \tan \theta \quad (4)$$

That is, as the roll center position becomes lower (closer to ground surface), tan θ is reduced and the vertical force $\Delta F_z$ is reduced, so that the vehicle body becomes less likely to wobble. Therefore, in the case where an external force applied to the wheel is great on a rough road or the like, it is preferable that the roll center position is lowered so that the vehicle is less likely to wobble. Thus, stability in operating the vehicle can be improved.

<Roll Center Controller 10>

Figure 2:
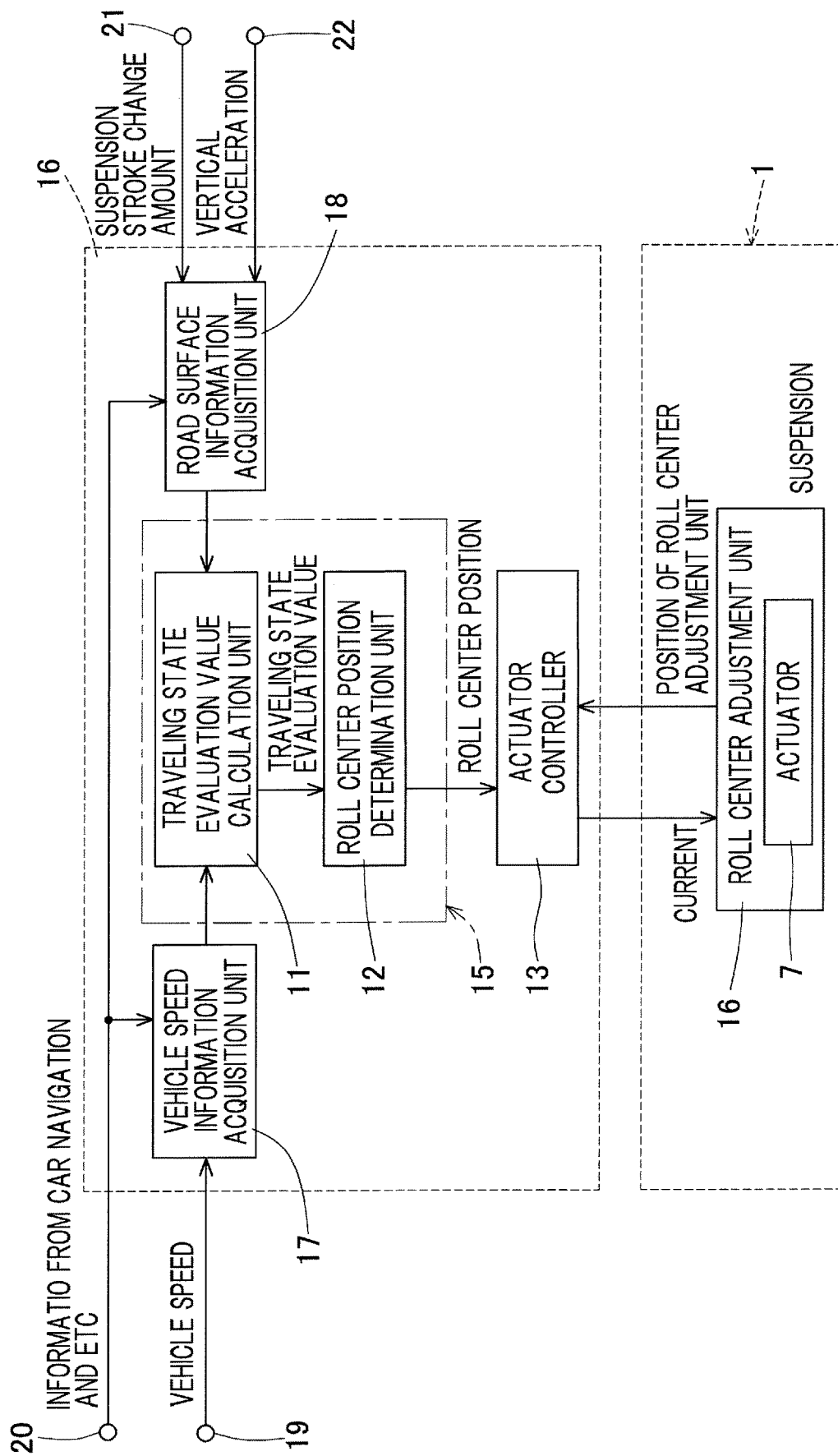
FIG. 2 is a block diagram showing a conceptual configuration of a roll center controller of the vehicular suspension device.

Next, with reference to FIG. 2, the roll center controller 10 will be described. The roll center controller 10 includes a traveling state corresponding height determination unit 15 and an actuator controller 13. The traveling state corresponding height determination unit 15 determines the height $h_c$ ($hc_g$, $h_{cf}$, $h_{cr}$) of the roll center position of the suspension 1 in accordance with a predetermined reference on the basis of vehicle speed information which is a vehicle speed or information about an estimated vehicle speed, and road surface information which is information about a road surface on which the vehicle is traveling. The actuator controller 13 performs control of driving and retaining the actuator 7 of the suspension 1 so as to achieve the roll center height $HC_g$ determined by the traveling state corresponding height determination unit 15. The traveling state corresponding height determination unit 15 includes a traveling state evaluation value calculation unit 11 for calculating a traveling state evaluation value from the vehicle speed information and the road surface information, and a roll center position determination unit 12 for determining the height $hc_g$ of the roll center position in accordance with the calculated traveling state evaluation value.

The roll center controller 10 further includes a vehicle speed information acquisition unit 17 for acquiring the vehicle speed information, and a road surface information acquisition unit 18 for acquiring the road surface information. The vehicle speed information acquisition unit 17 acquires the vehicle speed information by receiving information from a sensor 19 provided to the vehicle or from outside of the vehicle. For example, the vehicle speed information is acquired on the basis of road information such as the speed limit of the road on which the vehicle is traveling, from an external information receiving unit 20 such as car navigation (car navigation device) or an electronic toll collection (ETC) system. The vehicle speed may be acquired using position information obtained from the external information receiving unit 20. The "vehicle speed information" refers to information including the vehicle speed and the road information, but may be information about only the vehicle speed.

The road surface information acquisition unit 18 acquires the road surface information from a sensor provided to the vehicle or a device capable of receiving information from outside of the vehicle. For example, the stroke change amount (amount of stroke displacement from a reference position) of the suspension 1 is monitored by a suspension stroke sensor 21, and determination as to irregularity of the road surface is performed on the basis of the amplitude of the stroke change amount within a certain time period, thereby acquiring the road surface information. Alternatively, the road surface information may be acquired from the vertical acceleration obtained by an acceleration sensor 22 such as a gyroscope provided to the vehicle. In addition, as in the case of vehicle speed information, the road surface information may be acquired on the basis of road information received from the external information receiving unit 20 such as car navigation or ETC. The "road surface information" is information indicating the degree of irregularity of the road surface on which the vehicle is traveling.

Figure 7:
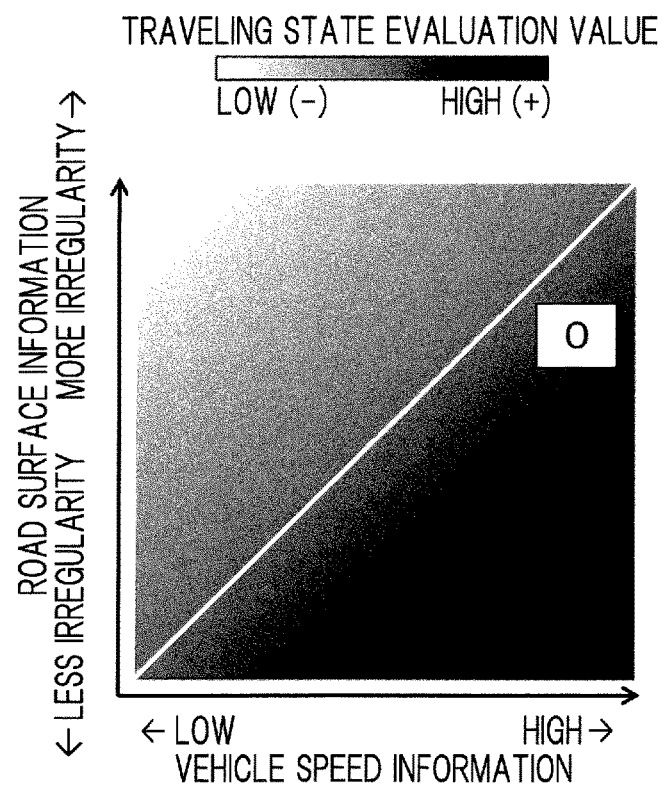
FIG. 7 illustrates an example of a map of the vehicular suspension device.
Figure 8:
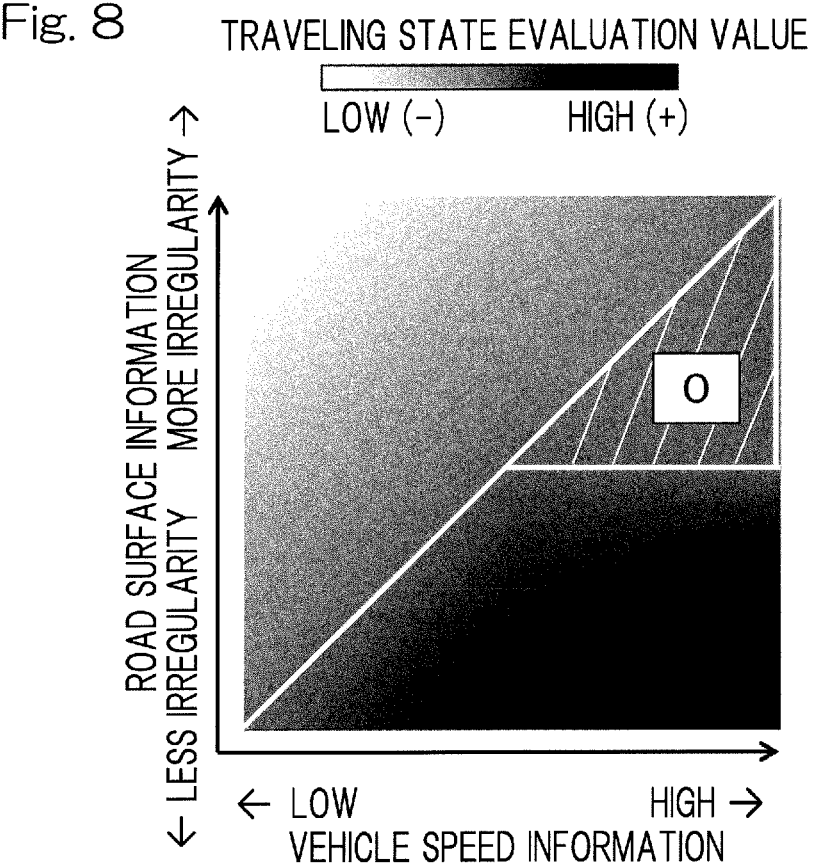
FIG. 8 illustrates another example of a map of the vehicular suspension device.

The traveling state evaluation value calculation unit 11 calculates a traveling state evaluation value from the vehicle speed information and the road surface information. For example, the traveling state evaluation value is calculated on the basis of a map set in advance as shown in FIG. 7 from vehicle speed information and road surface information. The map in FIG. 7 is formed as a matrix in which cells are arranged in the vertical and horizontal directions, and the colors of the cells are shown so as to become deeper as the evaluation value increases. The traveling state evaluation value is set to become higher as the vehicle speed obtained from the vehicle speed information increases or as the irregularity of the road surface obtained from the road surface information reduces. In this map, if an external force applied to the wheel is determined to be high as in the case of rough road, the traveling state evaluation value is set to be smaller than 0. On the other hand, if an inertial force on the vehicle is determined to be great during turning as in the case where the vehicle speed is high, the traveling state evaluation value is set to be greater than 0. Here, as shown in FIG. 8, the traveling state evaluation value may be limited so that the traveling state evaluation value becomes equal to or greater than 0 when the vehicle speed is equal to or higher than a certain value. As a matter of course, the traveling state evaluation value may be calculated from a calculation formula, instead of a map.

Figure 9:
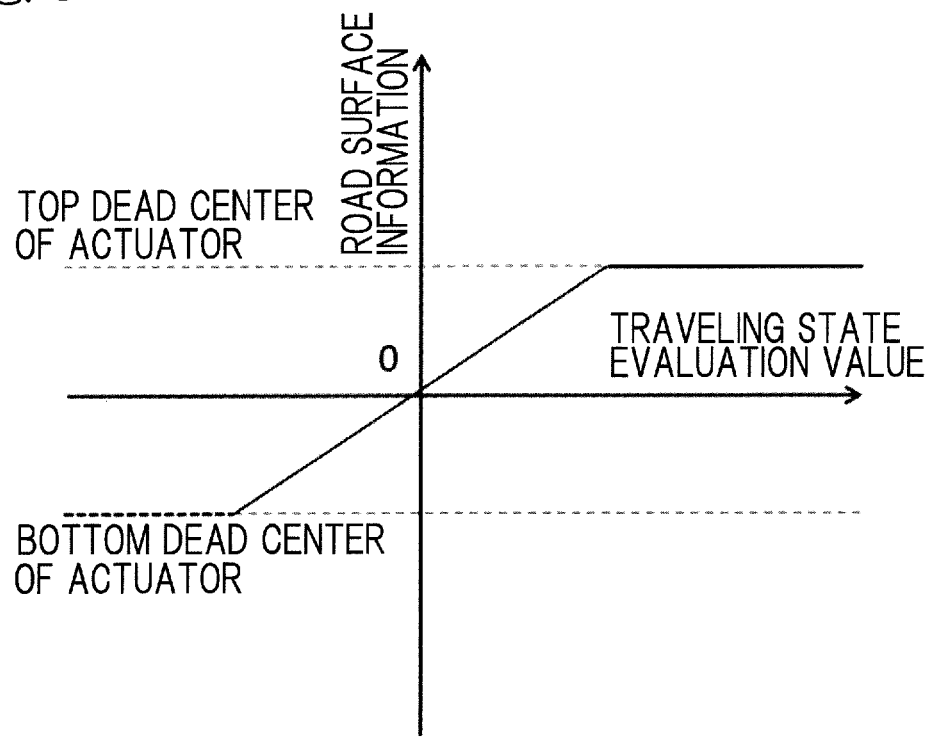
FIG. 9 is a graph showing the relationship between a traveling state evaluation value and a roll center position of the vehicular suspension device.

The roll center position determination unit 12 determines the roll center height so as to satisfy a linear relationship with the roll center evaluation value as shown in, for example, FIG. 9, on the basis of the traveling state evaluation value. In the case of traveling state evaluation value <0, the roll center positions of the front and rear wheels are determined to be lowered (brought close to ground surface). A traveling state in which traveling state evaluation value <0 is satisfied occurs in such a case of traveling on a rough road, and in this state, an external force applied to the wheel is great and a vertical force $\Delta F_z$ applied to the wheel due to this external force is great. Therefore, the roll center position is lowered to decrease the vertical force $\Delta F_z$ and suppress wobbling of the vehicle, whereby stability in driving the vehicle is improved.

In the case of traveling state evaluation value >0, the height positions of the roll centers Cf, Cr (see FIG. 5) of the front and rear wheels are determined to be raised (moved away from ground surface). A traveling state in which traveling state evaluation value >0 is satisfied occurs in such a case where the vehicle speed is high, and in this state, an inertial force (lateral acceleration) on the vehicle during turning is great, and therefore the roll moment $M_R$ is great and the roll amount is also great. Therefore, the roll center position is raised to decrease the roll moment $M_R$ and decrease the roll amount of the vehicle, whereby contact of the turning inner wheel with the ground is ensured and the vehicle movement performance is improved. In the case where traveling state evaluation value=0 is satisfied, the roll center position is kept at a reference position.

The actuator controller 13 performs position control of each actuator 7 in accordance with the determination by the roll center position determination unit 12.

<Functions and Effects>

In the vehicular suspension device configured as described above, the roll center height of the suspension 1 is controlled in accordance with the traveling state figured out from the speed and the road surface state. Accordingly, the relationship between the roll center height, and speed information and road surface information, is set as appropriate to be a proper relationship by using the map or the like, and the roll center height is changed by matching the speed information and the road surface information with the relationship, whereby stability in driving the vehicle is improved.

For example, in the case of traveling on a road surface having great irregularity as in a rough road, an external force applied to each wheel 8 increases. Therefore, if the external force applied to each wheel 8 is estimated to be great from the vehicle speed information and the road surface information as in the case of traveling on a rough road, the roll center positions of the front and rear wheels are lowered (brought close to ground surface), to reduce the vertical force applied due to the external force applied to each wheel 8. By reducing the vertical force applied to each wheel 8, wobbling of the vehicle is suppressed and stability in driving the vehicle is improved.

On the other hand, in the case where the vehicle speed is high, a great lateral acceleration is applied to the vehicle during turning, so that the inertial force in the lateral direction of the vehicle increases. Therefore, if, on the basis of the vehicle speed information and the road surface information, the inertial force in the lateral direction of the vehicle is estimated to be great during turning as in the case of traveling at a high vehicle speed, the roll center positions of the front and rear wheels 8 are raised (moved away from ground surface), to reduce the roll moment applied to the vehicle during turning. By reducing the roll moment generated during turning, the roll amount of the vehicle is decreased and contact of the turning inner wheels with the ground is ensured, whereby vehicle movement performance is improved. In this way, by adjusting the roll center heights in accordance with the traveling state of the vehicle, it is possible to achieve both of improvement in stability in operating the vehicle and improvement in vehicle movement performance.

In the above embodiment, the suspension 1 is a double wishbone type. However, the present invention is applicable to not limited thereto but to any types of suspensions that enable adjustment of the roll center positions. In the above embodiment, the roll center positions are adjusted by the suspensions 1 of both of the front and rear wheels. However, the roll center position may be adjusted by the suspension 1 of only the front wheel or the rear wheel.

Second Embodiment

Figure 11:
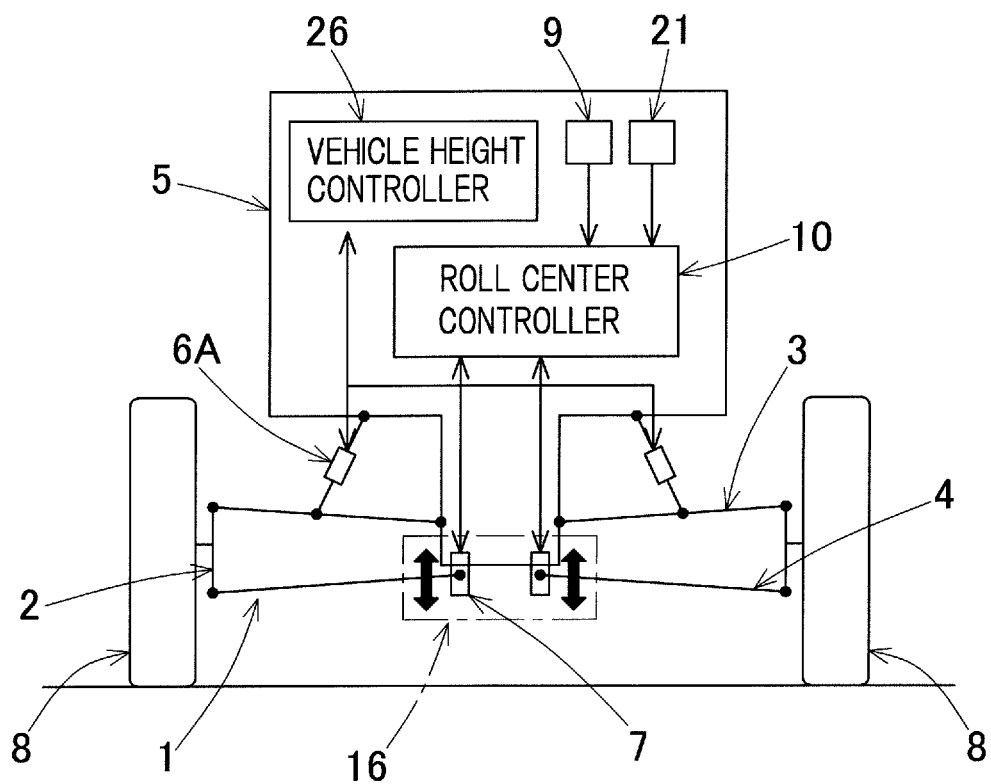
FIG. 11 is a schematic diagram showing a vehicular suspension device according to the second embodiment of the present invention.
Figure 12:
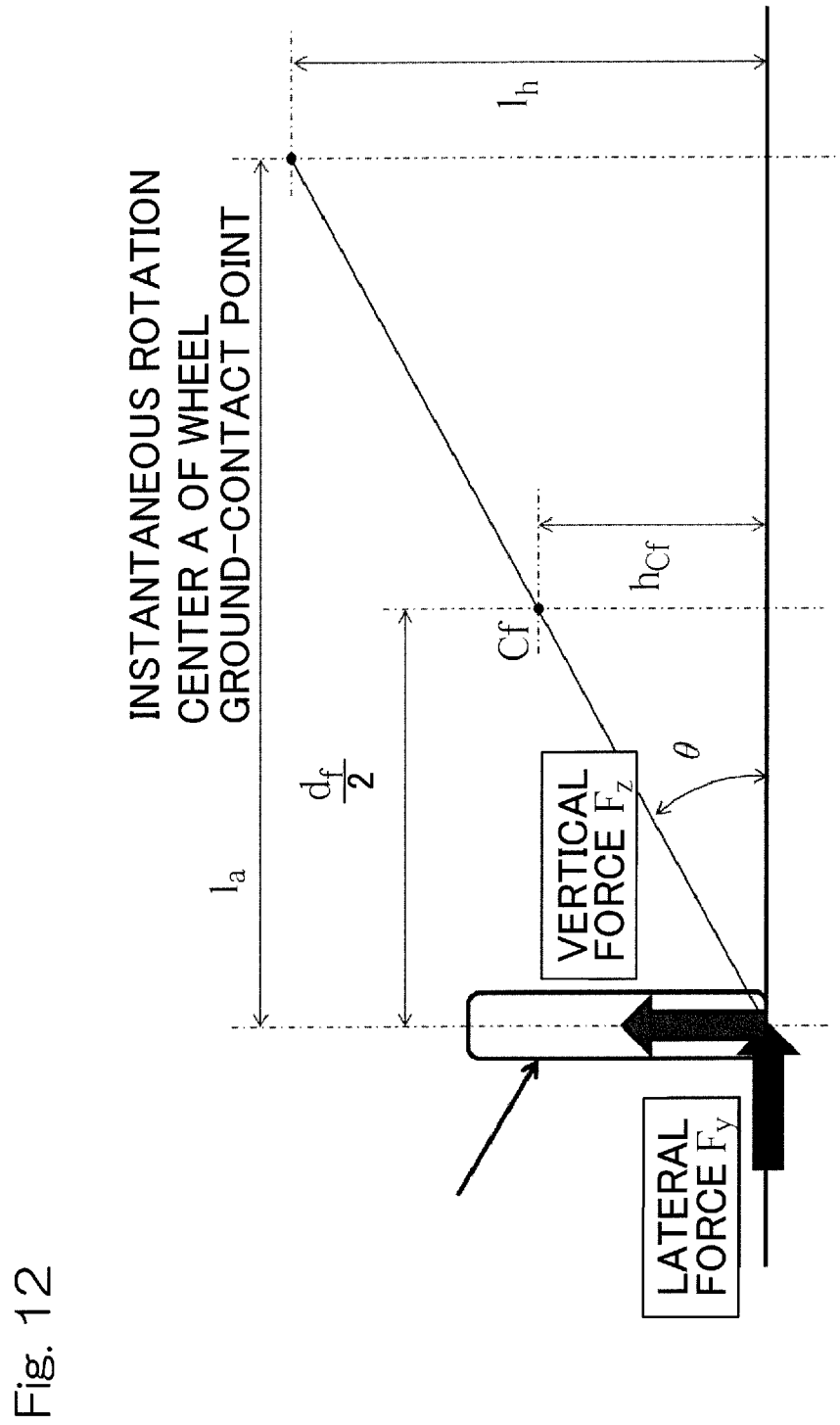
FIG. 12 is a diagram illustrating a roll center.

Adjustment of the roll center positions and adjustment of the vehicle height may be combined, using a suspension having a vehicle height adjustment function in combination. Adjusting the vehicle height and the roll center positions of a vehicle at the same time makes it possible to more effectively achieve both of movement performance and driving stability of the vehicle. The suspension having a vehicle height adjustment function includes, for example, as in the second embodiment shown in FIG. 11, a shock absorber unit 6A for adjusting the vehicle height by changing the entire length thereof, as a mechanism that enables adjustment of the vehicle height during traveling, and the vehicle height adjustment is performed by a vehicle height controller 26 during traveling. The shock absorber unit 6A having a vehicle height adjustment function has, in addition to a normal configuration as a shock absorber unit, a configuration of changing the entire length of the shock absorber unit 6A through advancement or retraction of a movable end by a combination of a hydraulic cylinder or an electric motor, and a linear motion mechanism.

The vehicle height controller 26 performs control in accordance with the distance between the road surface and the vehicle body, and the like, using, for example, a sensor (not shown) for measuring the distance between the road surface and the vehicle body, a roll rate sensor, and the like. In the case of performing control with the shock absorber unit 6A, the roll center controller 10 performs roll center control by, for example, subtracting the amount of change in the roll center due to the vehicle height adjustment in consideration of change in the vehicle height caused through the control by the vehicle height controller 26.

Although the embodiments for carrying out the present invention have been described, the embodiments disclosed herein are illustrative in all aspects and not restrictive. The scope of the present invention is indicated by the claims, rather than by the above description, and is intended to include any modifications within the scope and meaning equivalent to the claims.

REFERENCE NUMERALS

1 . . . Suspension
7 . . . Actuator
2 . . . Knuckle
3 . . . Upper arm
4 . . . Lower arm
5 . . . Vehicle body
6 . . . Shock absorber unit
6A . . . Shock absorber unit (Mechanism for adjusting vehicle height)
7 . . . Actuator
8 . . . Wheel
10 . . . Roll center controller
11 . . . Traveling state evaluation value calculation unit
12 . . . Roll center position determination unit
13 . . . Actuator controller
15 . . . Traveling state corresponding height determination unit
17 . . . Vehicle speed information acquisition unit
18 . . . Road surface information acquisition unit
20 . . . External information receiving unit

What is claimed is:

1. A vehicular suspension device comprising:
a suspension that supports a front wheel or a rear wheel so as to allow a roll center height of a vehicle to be adjusted by an actuator; and
a roll center controller configured to adjust the roll center height of the suspension by controlling the actuator,
wherein the roll center controller includes
a traveling state corresponding height determination unit configured to determine the roll center height of the suspension in accordance with a predetermined rule on the basis of vehicle speed information which is a vehicle speed or information about an estimated vehicle speed, and road surface information which is information about a road surface on which the vehicle is traveling, and
an actuator controller configured to control the actuator of the suspension so that the roll center height reaches the determined roll center height.

2. The vehicular suspension device as claimed in claim 1, wherein the traveling state corresponding height determination unit includes:
a traveling state evaluation value calculation unit configured to calculate a traveling state evaluation value in accordance with a predetermined evaluation rule on the basis of the vehicle speed information and the road surface information; and
a roll center position determination unit configured to determine the roll center height of the suspension in accordance with the traveling state evaluation value calculated by the traveling state evaluation value calculation unit.

3. The vehicular suspension device as claimed in claim 1, wherein the traveling state corresponding height determination unit determines the roll center height such that, during turning traveling, the roll center position is raised as a speed of the vehicle increases, and the roll center position is lowered when a lateral force applied to the wheel is greater than a predetermined value.

4. The vehicular suspension device as claimed in claim 1, wherein the traveling state corresponding height determination unit uses information acquired from outside of the vehicle, as both or one of the vehicle information and the road surface information.

5. The vehicular suspension device as claimed in claim 1, wherein the suspension has a mechanism that enables adjustment of a vehicle height during traveling.

6. The vehicular suspension device as claimed in claim 1, wherein a drive source for the actuator is an electric motor.

* * * * *